Figure 1:
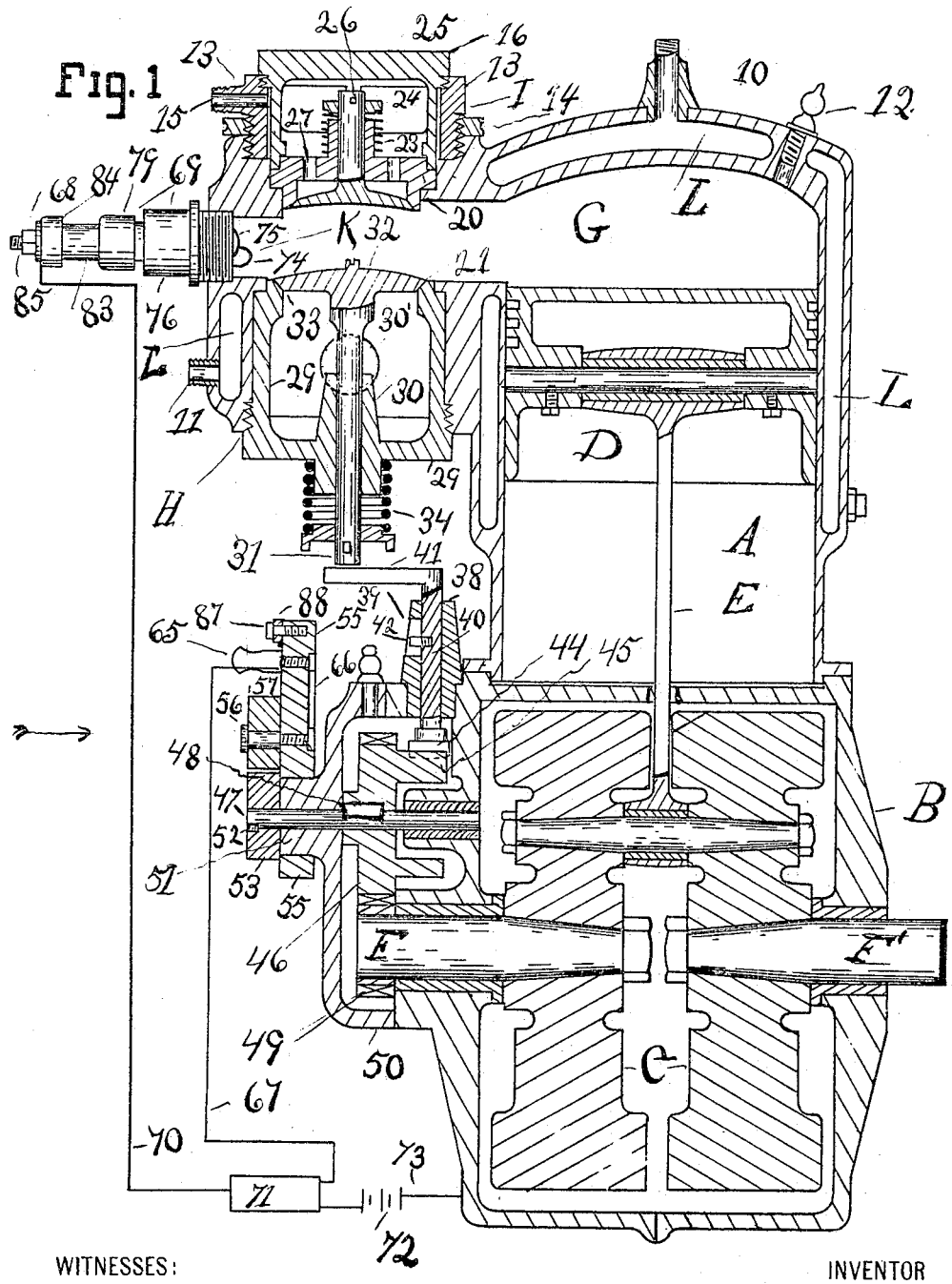

No. 781,802. PATENTED FEB. 7, 1905.
W. BARBER.
VALVE AND VALVE GEAR FOR EXPLOSIVE ENGINES.
APPLICATION FILED FEB. 24, 1902.

4 SHEETS—SHEET 1.

WITNESSES:
C. L. Davis
Theodore Jackson

INVENTOR
William Barber

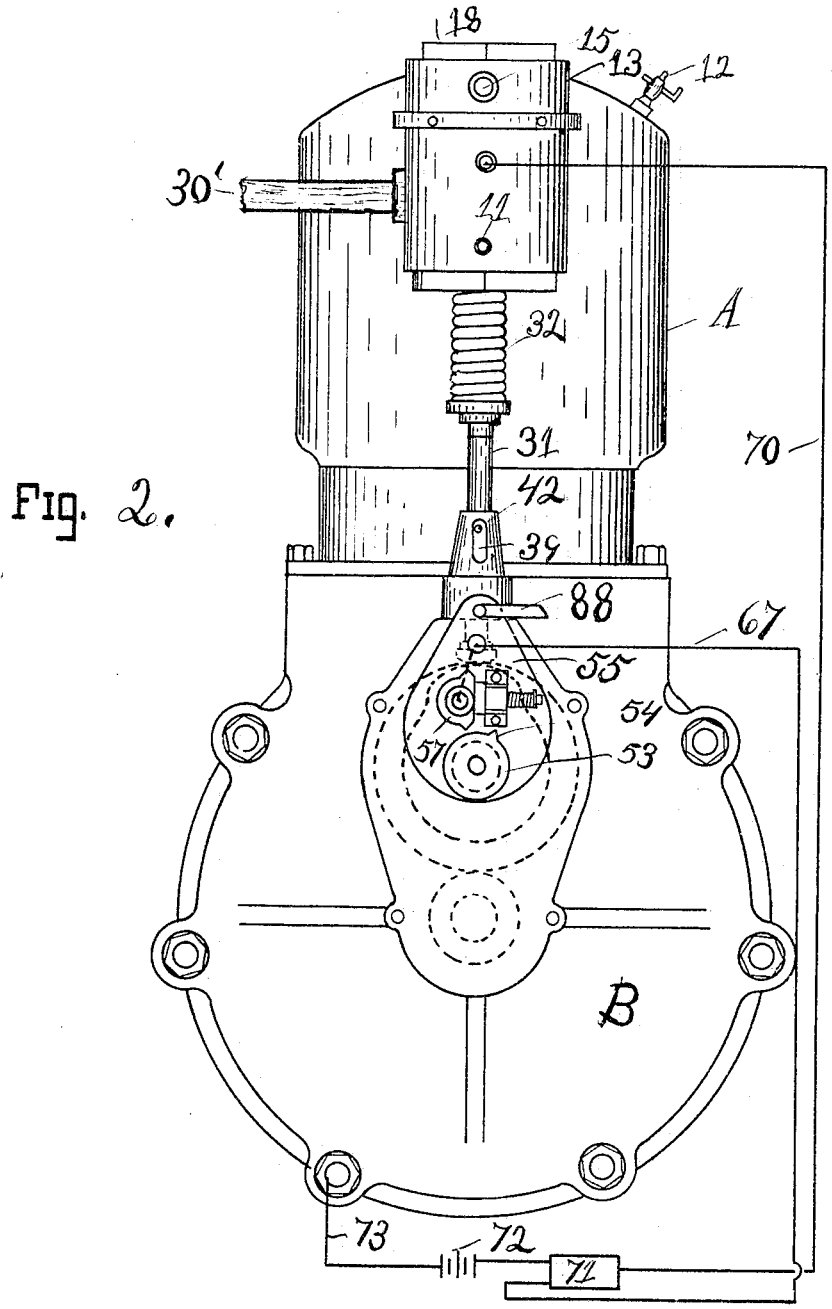

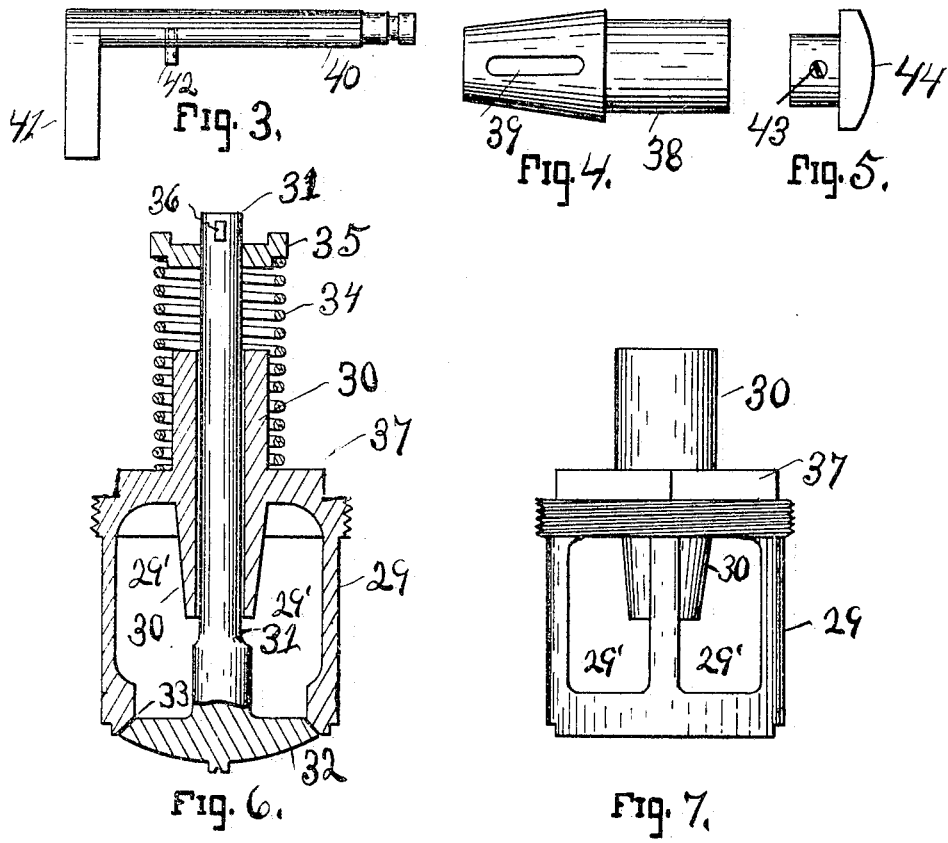

No. 781,802. PATENTED FEB. 7, 1905.
W. BARBER.
VALVE AND VALVE GEAR FOR EXPLOSIVE ENGINES.
APPLICATION FILED FEB. 24, 1902.

4 SHEETS—SHEET 4.

WITNESSES:
C. L. Davis
Theodore Jackson

INVENTOR
William Barber

No. 781,802.                                    Patented February 7, 1905.

UNITED STATES PATENT OFFICE.

WILLIAM BARBER, OF BROOKLYN, NEW YORK, ASSIGNOR TO ADA S. BARBER, OF BROOKLYN, NEW YORK.

VALVE AND VALVE-GEAR FOR EXPLOSIVE-ENGINES.

SPECIFICATION forming part of Letters Patent No. 781,802, dated February 7, 1905.

Application filed February 24, 1902. Serial No. 95,332.

*To all whom it may concern:*

Be it known that I, WILLIAM BARBER, a citizen of the United States, residing in the borough of Brooklyn, county of Kings, in the city and State of New York, have invented certain new and useful Improvements in Valves and Valve-Gear for Explosive-Engines, of which the following is a specification, such as will enable others skilled in the art to which it appertains to make and use the same.

The object of my invention is to provide a motor-engine of the explosion-vapor type of a simple and cheap form of constructon, so made that the inlet and exhaust valves thereof may be quickly and easily removed from the body of the motor without disturbance of the other parts, and quickly cleaned, adjusted, or renewed, as occasion may require, and returned to position, and also to provide motors of such type with a combined electric circuit making and breaking and speed-regulating device of improved form.

To such ends my invention consists, in substance, of a cylinder, a piston reciprocating in the cylinder, a crank-shaft in actuative connection with the cylinder by means of a connecting-rod, an explosion-chamber adjacent to the cylinder in communication with inlet and exhaust passages, an exhaust-valve plug located in the exhaust-passage, a normally spring-closed exhaust-valve carried by the exhaust-valve plug, a gear-wheel carried by the crank-shaft, a combined gearing and a cam-wheel rigidly mounted upon an idler-shaft meshing with a wheel carried by the crank-shaft, and a rod reciprocating in a slip-journal actuated by the cam so as to open the exhaust-valve, such rod being adapted by rotation upon its axis to be thrown out of engagement with the rod of the exhaust-valve, a contact-wheel rigidly secured upon the outer end of the idler-shaft carrying the combined spur-gear and cam-wheel, a plate of insulating material vibratorily mounted adjacent to the contact-wheel, a spring-contact carried by such insulating-plate in electrical connection with one terminal of a sparking plug, the sparking point of which is located in the chamber of the motor, the other sparking point of which plug is in connection by way of the motor-frame with the contact-wheel carried by the idler-shaft by way of a source of electric energy, means for vibrating the insulated disk or plate, so as to change the point of contact as the idler-shaft is rotated, an inlet-valve bushing adapted to be secured in the casing of the explosion-chamber, so as to be in communication therewith with the atmosphere and with the explosive-vapor-supply source, and an inlet-valve plug carrying a normally closed inlet-valve adapted to inclose the inlet-bushing, although it is not to be understood that my invention is limited to a device comprising at once all of the devices and parts before mentioned, as the same consists of the construction of certain devices and parts and the construction, combination, and arrangement of certain devices and parts, all as hereinafter more particularly set forth in the description and pointed out in the claims.

My said invention is fully shown and set forth in the following specification, of which the accompanying drawings form a part, wherein similar letters or numerals of reference designate like or equivalent parts wherever found throughout the several views, in which—

Figure 14:
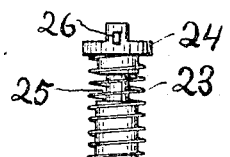
Figure 11:
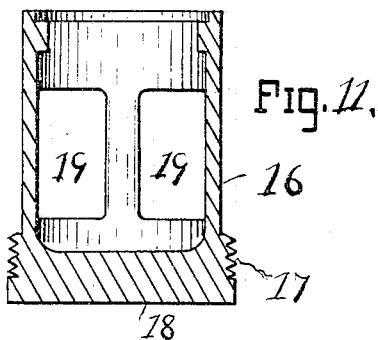
Figure 15:
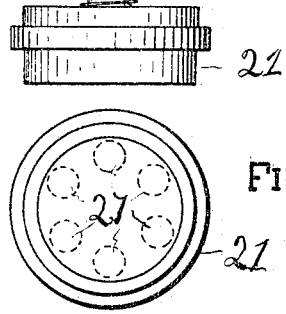
Figure 12:
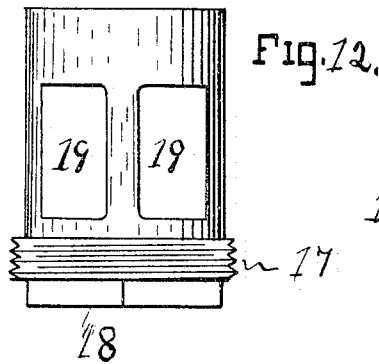
Figure 16:
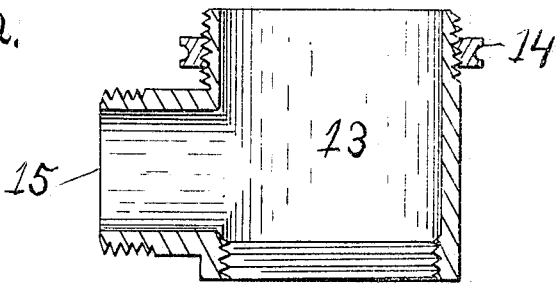
Figure 13:
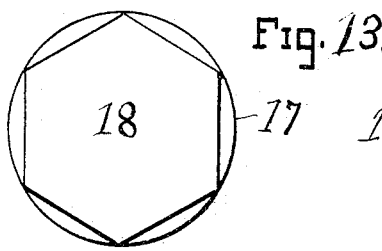
Figure 17:
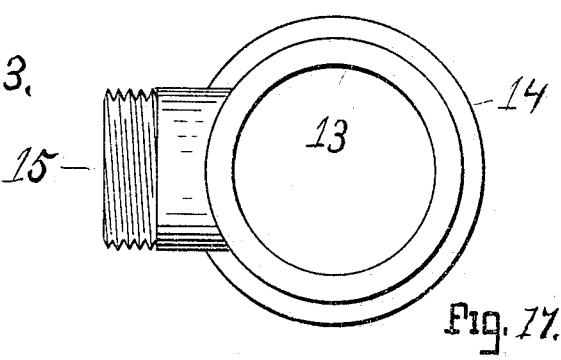

Figure 1 is a view in central vertical section of my improved explosion-vapor motor-engine in central vertical section looking from the side. Fig. 2 is a view thereof in perspective looking in the direction of the arrow shown in Fig. 1. Fig. 3 is a side view in detail of the shaft or cam-rod of the exhaust-valve. Fig. 4 is a like view of the removable slip-journal piece carrying such exhaust-valve shaft, and Fig. 5 is a like view of the cam contact end piece secured to the end of such shaft. Fig. 6 is a side detail view inverted, in central vertical section, of the exhaust-valve and exhaust-valve plug of my improved motor. Fig. 7 is a like view from the side of the exhaust-valve plug with the valve removed therefrom. Fig. 8 is a view of the part shown in Fig. 7 looking from the top, and Fig. 9 is a view of the parts shown in Fig. 6 looking from the bottom. Fig. 10 is a front view in detail of the combined sparking-contact-igniting and speed-regulating device. Fig. 11 is a side view, in central longitudinal section and inverted, of the inlet-valve plug carrying the inlet-valve by which the explosive-vapor charge is admitted to the explosion-chamber of the motor, the same being shown upon a scale somewhat larger longitudinally than in Figs. 1 and 2, wherein the same has been somewhat shortened in length to better show other portions of the device; and Fig. 12 is a view from the side of the portion shown in Fig. 11, and Fig. 13 is an end view thereof looking upward. Fig. 14 is a side view of the inlet-valve, inlet-valve-seat ring, inlet-valve spring, and spring-securing washer, all secured together in working position; and Fig. 15 is an end view of the two parts shown in Figs. 11, 12, 13, and 14 secured together. Fig. 16 is a side view, in central vertical section, of the inlet-valve-plug bushing inverted, showing the lock-nut ring in position thereon. Fig. 17 is a bottom view of the portion shown in Fig. 16.

Referring to the drawings, as shown in Figs. 1 and 2, the reference-letter A designates the cylinder; B, the casing inclosing the combined double fly-wheel and crank-shaft C, connected with the piston D in the usual manner by means of the piston-rod E, the main shaft F being divided into two parts F and F', bolted to the parts of the fly-wheel, which in connection therewith forms the crank, such shaft being journaled in the casing B, as shown. Above the cylinder A proper is the explosion-chamber G, usually of the elongated form, shown extending at right angles to the axis of the cylinder A and having on the side of the extension forming the outer end of such cylinder the exhaust-orifice H and on the opposite side the inlet-orifice I, and formed in the explosion-chamber wall at the end of the extension thereof between the inlet and outlet orifices is the ignition-plug orifice K. As I prefer to form the same the cylinder A, explosion-chamber G, and the exhaust-orifice H are all surrounded by a water-cooling chamber L, into which water for cooling is passed through the inlet-orifice 10, which flows out therefrom through the outlet-pipe 11, or the device may be cooled by any other appropriate liquid or device that may be desired. The explosion-chamber G is also usually provided with a pet-cock 12 of the usual form for allowing the escape of the spent gases when desired.

Thus far and as described the device is of the well-known form in common use; but in such devices as heretofore used the larger proportion of accidents thereto and stoppages thereof when in operation are caused by clogging of either the exhaust or inlet valves, and in order to clear the same it has heretofore been necessary to remove numerous parts and uncouple the same one from another in order to put the motor in condition for operation again. This difficulty I obviate by so constructing and securing the inlet-valve to the casing of the explosion-chamber that by the unscrewing of a single screw part such valve, together with its seat, may be removed bodily from the casing, cleaned, adjusted, or renewed, and again returned to position by reversal of this process, and by also providing an exhaust-valve plug carrying the exhaust-valve screwed into the casing, so as to close the outlet or exhaust orifice thereof, which exhaust-valve plug and valve may be removed bodily from the casing by simply unscrewing the same after a set-screw has been removed from the cam-rod actuating the same and such rod given a quarter-revolution, the valve then being movable from its seat by the removal of a key. My improved form of construction of such valves, as shown in the drawings, in the case of the inlet-valve consists of a bushing 13, provided upon one end with an exterior and upon the other with an interior screw-thread, the exterior screw-thread being adapted to screw tightly into the outer screw-threaded portion of the inlet-orifice I and being provided with a lock-nut 14, by which, after being once screwed home and into position, such bushing may be firmly locked in place and against retraction. Such bushing is provided in its top portion with a screw-threaded inlet-orifice 15, usually of the form shown in detail in Figs. 16 and 17, whereby such bushing forms an L-coupling of the form shown when in operation, the screw-threaded inlet-orifice 15 being connected with a suitable pipe, (not shown,) through which the explosive vapor for the actuation of the motor is drawn from the carbureter or other suitable supply source, and by this arrangement and construction it will be seen that the inlet-orifice 15 may be quickly and easily shifted to any desired position if it be desired to shift the position of the gasolene tank or motor, it only being necessary to loosen the lock-nut 14, turn the bushing to the new position, and again tighten up the lock-nut. Screwed firmly into the outer end of this inlet-bushing is the inlet-valve plug 16, which is of the form shown in detail in Figs. 11 and 12, as the same appears when inverted, being closed at the outer or screw end 17, where it is provided with the hexagonal nut-head 18 to facilitate the insertion and removal of the same and being provided in the side walls of the lower portion thereof, which is of considerable less diameter than is the central chamber of the bushing 13, in which the same rests, with a plurality of perforations 19, by and through which free communication will be formed between the interior of such plug and the vapor-orifice 15 when the parts are in the position shown in Fig. 1.

The inlet-orifice I is provided at its inner end with a square-faced annular flange 20, between which and the lower end of the inlet-valve plug 16 is firmly held in position the valve-seat ring 21, which valve-seat ring is usually of the form shown in cross-section in Fig. 1 and in side and bottom view in detail in Figs. 14 and 15, the exhaust-valve proper, 22, being normally held in contact with the seat thereof by means of the spring 23, acting upon the washer 24, held in position upon the stem 25 by the cotter-pin 26, the explosive vapors finding free passage from the interior of the inlet-plug 16 to the rear face of the valve 22 by way of suitable perforations 27, as shown in full lines in Fig. 1 and in dotted lines in Fig. 15. By this arrangement it will be seen that, the parts being in the position shown in Fig. 1, if the valve 22 should not work properly by simply unscrewing the plug 16 and removing the same from the orifice the valve-seat ring 21 and the valve 22 may together be lifted bodily from the exhaust-orifice, be cleaned, repaired, or renewed, and again inserted in position ready for use without disturbance of the bushing 13 of the connections with the vapor-supply or any of the other portions of the device.

The exhaust-valve mechanism consists of a plug 29, screwed firmly into the exhaust-orifice of the extension of the explosion-chamber, preferably located exactly opposite to and underneath the inlet-orifice I, as shown in Fig. 1, which plug is provided with a central inwardly and outwardly extending slip-journal boss 30, through which passes the stem 31 of the exhaust-valve 32, such valve being kept in close contact with the valve-seat 33, formed upon the inner end of the plug 29, by means of a spring 34, surrounding the outer portion of the boss 30, and secured between the rear outer end of the plug 29 and a washer-head 35 by means of a pin 36 or in any other desired manner. As shown in detail in Fig. 6, the plug 29 is of a cage form, being provided with openings 29' in the side wall thereof, one of which when the plug is in position in the exhaust-orifice registers with the inlet to the exhaust-pipe 30', as shown in Figs. 1 and 2, and such plug 29 is also provided with an exterior hexagonal nut portion 37, as shown in detail in Figs. 7 and 8, in order to facilitate the screwing into and unscrewing from the exhaust-orifice of such plug and valve.

Located and supported in the extension of the casing B immediately below the exhaust-valve, as shown in Fig. 1, is a slip-journal 38, preferably of the shape shown, which is fitted into the engine-frame by a tight driving fit, so as to be incapable of movement, or may be even formed integral therewith. In this slip-journal 38 reciprocates up and down the cam-rod 40, provided at the upper end with the right-angle extension 41. The rod 40 is normally held against rotation in the journal by a set-screw 42, which passes through an elongated slot 39, formed in the journal 38 in the position shown in Fig. 1, the extension 41 being then in registry with the lower end of the exhaust-valve stem 31, so as to lift the same and open the valve when the rod 40 is reciprocated upward. In order to rotate the rod 40 so as to bring the extension 41 out of registry with the valve, so as to permit removal of the valve, it is only necessary to take out the set-screw 42, when of course the rod may be easily rotated a quarter or a half turn in its journal, and after the reinsertion of the valve upon the reswinging to place of the rod and the reinsertion of the set-screw 42 the motor will be instantly ready for service, as there has been no disarrangement whatever of the cam or other parts regulating the timing of the valve. To the lower end of the rod 40 is firmly secured, by means of a set-screw 44, the cam-head 34, which is in actuating connection with the cam portion 45, formed integral with the gear wheel or pinion 46, which is rigidly secured upon the idler-shaft 47 by means of a key 48 or in any other desired manner, which gear-wheel 46 meshes with a similar gear wheel or pinion 49, rigidly secured in any desired manner upon the main shaft F, which gear wheel or pinion 49 is of one-half the diameter and number of teeth as is the wheel or pinion 46, whereby there will be only one revolution of the wheel 46 to each two revolutions of the wheel 49.

Covering and concealing from view the gear-wheels 46 and 49 and secured in any desired manner to the casing B is a cover-piece 50, provided with an outwardly-extending boss 51, through which passes the idler-shaft 47, and outside of this boss upon such idler-shaft is rigidly secured, so as to rotate in unison therewith, usually by means of the set-screw 52, the electric contact wheel or cam 53, which, as shown in detail in Fig. 10, is provided with the contact lip or tooth 54. Vibratorily mounted upon the boss 51 of the cover-piece 50 and held in position thereon by the contact-wheel 53 is an insulating-plate 55, (shown in detail in Fig. 10,) formed of hard rubber, papier-mâché, or any other suitable hard insulating material, to the front face of which is pivoted upon a metallic pivot 56 the contact-piece 57, provided with the contact-point 58, adapted to be brought into contact with the tooth 54 of the contact-wheel 53 once upon each rotation of such contact-wheel, the flat surface 59 of such contact-piece 57 abutting against a head 60 of a rod 61, normally pressed toward such face by a spring 62, such rod, spring, and head being held in proper position by means of a yoke-piece 63, secured upon the insulating-plate 55 by means of screws 64 or in any other desired manner. Passing through the plate 55 is a suitable screw contact-nut 65 in electrical connection with a stud 56 and contact-piece 57 by means of a suitable electrical conducting-wire 66, (shown in dotted lines in Fig. 10,) located in a suitable slot formed to receive it in rear face of the insulating-plate 55, (shown in Fig. 1,) and to this contact-nut 65 is connected an electric conducting-wire 67, connected with the energizing-coil of the induction-coil 71, which is in connection with the insulated pole 75 of the sparking plug 69 by way of another wire, 70, of such induction-coil 71, which is in energizing connection with the battery 72, which battery is also in connection with the casing B by means of a wire 73. By this arrangement it will be seen that as the main shaft F is rotated to the right, looking in the direction of the arrow in Fig. 1, the idler-shaft 47 will be rotated to the left and as it is so rotated that once in each revolution the contact-point 54 of the contact-wheel 53 will be brought into contact with the contact-point 58 of the contact-piece 57, which by reason of the yielding of the spring 62 will allow the same to pass freely thereby and that this will close the electric circuit through the battery-energized primary coil of the induction-coil 71, formed partially by the coil and conducting-wires and connections and partially by the frame of the motor, so as to cause a sparking action between the sparking point 74 of the sparking plug 69, which plug is in firm electrical contact with the outer securing-bushing 76 of such plug, which is in electrical connection with the frame by being screwed firmly into the sparking-plug orifice K in the end of the extension of the explosion-chamber G and the central rod 75, which is insulated in such bushing in the manner hereinafter described and is in electrical connection with the conducting-wire 70.

The insulating-plate 55 has pivotally secured to the upper end thereof by means of a pivot 87 an actuating connecting-rod 88, by which such insulating-plate may be vibrated upon the supporting-bushing 51, on which the same is vibratorily mounted, as hereinbefore described, and by this vibration it will be seen that the speed of the motor may be regulated within wide limits, as it will cause the passage of the explosion-spark to occur at moments when the motor-gases are under different compressions—the greater the compression the greater the speed generated.

What I claim, and desire to secure Letters Patent, is—

1. In an explosion-motor, the combination with an explosion-chamber having an inlet-orifice formed in the wall thereof, of a bushing secured in such inlet-orifice provided at one side with means for connecting the same with an explosive-vapor-supply pipe, a normally closed inlet-valve located in such inlet-orifice, and a removable plug secured in the bushing so as to close the outer end thereof and secure the valve in position in such manner that the valve may be removed without disturbance of the bushing upon removal of the plug, substantially as shown and described.

2. In an explosion-motor, the combination with an explosion-chamber having an inlet-orifice formed in the wall thereof, of a bushing secured in such inlet-orifice and extending outward beyond the same, means for connecting the bushing at a point outside of the wall of the explosion-chamber with an explosion-vapor supply, a valve-seat or plug provided with gas-passages located in the inlet so formed, a normally closed valve carried by the valve-seat, and a screw-threaded plug with perforate walls closing the outer end of the bushing and securing the valve-seat and valve in position in such manner that the same may be easily removed upon the removal of the plug, substantially as shown and described.

3. In an explosion-motor, the combination with an explosion-chamber having an inlet-orifice formed in the wall thereof, provided with a screw-thread, of a bushing provided at one side with an inlet-orifice screwed into the inlet-orifice of the explosion-chamber, a lock-nut locking such bushing in position, a valve-seat piece or ring provided with gas-passages located in the inlet-orifice, a normally closed valve carried by the valve-seat ring, and a screw-threaded plug with a perforate wall screwed into the bushing so as to secure the valve-seat plug in position in such manner as to permit the removal of such valve-seat ring and valve without disturbance of the bushing, substantially as shown and described.

4. In an explosion-motor, the combination with an explosion-chamber having an outlet-orifice formed in the wall thereof, provided with a screw-thread, of a screw-plug provided with a perforate wall adapted to close such orifice, a puppet-valve the stem of which reciprocates in the end of the plug extending outward therethrough, and means for keeping the valve normally in a closed position, substantially as shown and described.

5. In an explosion-motor, the combination with an explosion-chamber communicating with an exhaust-outlet at the side and having an outlet-orifice formed in the wall thereof, provided with a screw-thread, of a screw-plug provided with a perforate wall adapted to close such orifice at the outer end, a puppet-valve the stem of which reciprocates in the end of the plug extending outward therethrough means for keeping the valve normally in closed position, a main shaft a piston in actuating connection with the main shaft so as to rotate the same, a slip-journal adjacent to the outer end of the stem of the exhaust-valve, an exhaust-valve-actuating cam-rod adapted to reciprocate in the slip-journal provided with an actuating-head extending at right angles to the axis of such rod adapted to be brought into and out of registry with the outer end of the valve-stem of the exhaust-valve by partial rotation of the rod, adjustable means for securing the rod against rotation in the slip-journal, and mechanism for reciprocating the rod forming an actuating connection between the main shaft and reciprocating rod, substantially as shown and described.

6. In an explosion-motor, the combination with a removable exhaust-valve plug carrying a puppet-valve the stem of which extends outward axially through the same, which plug is provided with a perforate wall, through the perforations of which communication is made between the interior of such plug and the exhaust or outlet orifice in the side of the plug-chamber or exhaust-orifice, of a head or washer secured upon the outer end of the valve-stem a spiral spring surrounding the valve-stem interposed between such washer and the rear of the plug carrying the valve, a slip-journal carried by the motor-casing adjacent to the outer end of the valve-stem when the plug is in position, which journal is provided with a side slot, a valve-actuating cam-rod provided with an actuating-head extending at a right angle thereto adapted to be brought into and out of actuating connection with the valve-stem upon partial rotation of the rod in the slip-journal, a set-screw passing through the slot in the valve-stem adapted to secure such rod in the journal against rotation passing through the slot, a cam-head or contact-piece secured to the end of the rod, a piston, a main shaft in rotative connection with the piston, and a cam-wheel in rotative connection with the main shaft adapted to reciprocate the valve-actuating cam-rod in such manner as to open the exhaust-valve, substantially as shown and described.

7. In an explosion-motor, the combination with an explosion-chamber having an inlet-orifice formed in the wall thereof, of a bushing secured in such inlet-orifice and extending outward beyond the same, an inlet-orifice for the entry of the explosive vapor or gases formed in the bushing-wall so as to be exterior to the explosion-chamber wall when in position, a valve and valve-seat in the inlet-orifice, a plug closing the outer end of the bushing and holding the valve and valve-seat in position, and means for locking and securing the bushing in position when the inlet-orifice in such bushing faces in any direction, substantially as shown and described.

8. In an explosion-motor, the combination with an explosion-chamber having a T-shaped gas-passage the main central or stem portion of which forms the explosive-vapor inlet, of a valve-seat ring provided with gas-passages located in the end of the head portion of the T-passage adjacent to the explosion-chamber, a puppet-valve carried by the valve-seat ring opening toward the explosion-chamber, a spring normally keeping the valve in the closed position, and a screw-plug provided with a perforate peripheral wall and a closed outer and an open inner end closing the outer or air end of the head portion of the T-shape passage and holding the valve-seat ring in position thereof, through the perforations in the wall of which the explosive vapor passes from the main or stem portion of the T to the valve at the open end of such plug, substantially as shown and described.

9. In an explosion-motor, the combination with an explosion-chamber having a T-shaped gas-passage the main central or stem portion of which forms the exhaust-orifice of the explosion-chamber of a screw-plug closed at the outer end, open at the inner end and having a perforated peripheral wall so as to give free communication between the central hollow thereof and the main stem or central passage and the explosion-chamber located in the head portion of the T-shaped passage, a puppet-valve the stem of which projects outward through the head of the plug seated upon the inner end of the plug so as to cut off communication between the main stem portion of the T-passage and the explosion-chamber except when the same is forced away from the seat and toward the explosion-chamber, a spring for normally keeping the valve in the closed position and means for forcing the valve-stem inward so as to open the valve actuated by the motor and adapted to be removed from contact with the valve-stem without removal from the support thereof so as to permit of removal of the plug and valve by the unscrewing of the plug, substantially as shown and described.

10. In an explosion-motor, the combination with an explosion-chamber having a T-shaped gas-passage the main central or stem portion of which forms the explosive-vapor inlet, of a valve-seat ring provided with gas-passages located in the end of the head portion of the T-passage adjacent to the explosion-chamber, a puppet-valve carried by the valve-seat ring opening toward the explosion-chamber, a spring normally keeping the valve in the closed position, a screw-plug provided with a perforated peripheral wall, a closed outer and an open inner end closing the outer or air end of the head portion of the T-shaped passage and holding the valve-seat ring in position, through the perforations in the wall of which the explosive vapor passes from the main or stem portion of the T to the valve at the open end of such plug, a T-shaped gas-passage the main central or stem portion of which forms the exhaust-orifice of the explosion-chamber, a screw-plug closed at the outer end, open at the inner end and having a perforate peripheral wall so as to give free communication between the central hollow thereof and the main stem or central passage and the explosion-chamber located in the head portion of the T-shaped passage, a puppet-valve the stem of which projects outward through the head of the plug seated upon the inner end of the plug so as to cut off communication between the main stem portion of the T-passage and the explosion-chamber except when the same is forced away from the seat and toward the explosion-chamber, a spring for normally keeping the valve in the closed position, and means for forcing the valve-stem inward so as to open the valve actuated by the motor and adapted to be removed from contact with the valve-stem without removal from the support thereof so as to permit of removal of the plug and valve by the unscrewing of the valve, substantially as shown and described.

11. In an explosive-vapor engine, a T-shaped bushing adapted to be secured in the inlet-orifice and locked against rotation in any desired position so that the inlet-orifice of the bushing may be made to face in any desired direction, a spring-valve closing the orifice forming the passage between the bushing and the explosion-chamber, and a removable plug closing that orifice of the bushing which is axially in line with the passage between such bushing and explosion-chamber in such manner that upon removal of the plug the valve may be removed without disturbance of the bushing, substantially as shown and described.

12. In an explosion-motor, a valved inlet-orifice closed at the outer open end by a bushing screwed into the same the outer end of which bushing is closed by a removable plug, an inlet-orifice adapted to be connected with an explosive-vapor supply formed in and through the wall of the bushing adjacent to the outer end thereof, and a lock-nut screwed upon the bushing between the inlet and the inner end thereof for locking the same in any required position, substantially as shown and described.

13. In an explosion-motor a bushing revolubly secured in the inlet or explosion-gas orifice of the motor provided in the side wall adjacent to the outer end thereof with means for securing the same to an explosive-vapor-supply pipe, and means for locking the bushing in position when the said means faces in any direction, substantially as shown and described.

In testimony whereof I have signed my name to this specification in the presence of two subscribing witnesses.

WILLIAM BARBER.

Witnesses:
   C. L. DAVIS,
   L. V. FUGAZY.